(12) United States Patent
Taga et al.

(10) Patent No.: US 7,297,198 B1
(45) Date of Patent: *Nov. 20, 2007

(54) INK FOR INK-JET RECORDING

(75) Inventors: Yasuhiro Taga, Nagoya (JP); Tomoyo Hamajima, Nagoya (JP); Masaya Fujioka, Nagoya (JP); Kazuma Goto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/675,286

(22) Filed: Feb. 15, 2007

(30) Foreign Application Priority Data

Feb. 16, 2006 (JP) .............................. 2006-038769

(51) Int. Cl.
*C09D 11/00* (2006.01)
*C09D 11/02* (2006.01)

(52) U.S. Cl. .................................................. 106/31.49
(58) Field of Classification Search .............. 106/31.49
See application file for complete search history.

(56) References Cited

U.S. PATENT DOCUMENTS

| | | | | |
|---|---|---|---|---|
| 4,786,327 A | * | 11/1988 | Wenzel et al. | 106/31.32 |
| 5,534,051 A | * | 7/1996 | Lauw | 106/31.43 |
| 5,536,306 A | * | 7/1996 | Johnson et al. | 106/31.49 |
| 5,626,655 A | * | 5/1997 | Pawlowski et al. | 106/31.27 |
| 5,766,327 A | * | 6/1998 | Maze | 106/31.58 |
| 5,858,075 A | * | 1/1999 | Deardurff et al. | 106/31.27 |
| 5,925,176 A | * | 7/1999 | Rehman | 106/31.43 |
| 5,948,154 A | * | 9/1999 | Hayashi et al. | 106/31.48 |
| 6,365,720 B1 | | 4/2002 | Schacht et al. | |
| 6,444,807 B1 | | 9/2002 | Wolleb et al. | |
| 6,495,250 B1 | | 12/2002 | Schacht et al. | |
| 6,514,330 B1 | | 2/2003 | Kanaya et al. | |
| 6,641,257 B1 | * | 11/2003 | Shi et al. | 347/100 |
| 7,073,900 B2 | * | 7/2006 | Aoi et al. | 347/100 |
| 2003/0105321 A1 | | 6/2003 | Wolleb et al. | |
| 2005/0264600 A1 | * | 12/2005 | Moffatt et al. | 347/33 |
| 2006/0127272 A1 | * | 6/2006 | Saitmacher et al. | 422/28 |
| 2006/0152569 A1 | * | 7/2006 | Jinnou et al. | 347/105 |

FOREIGN PATENT DOCUMENTS

| | | |
|---|---|---|
| JP | 2000303009 | 10/2000 |
| JP | 2000355665 | 12/2000 |
| JP | 2002526589 | 8/2002 |

OTHER PUBLICATIONS

U.S. Appl. No. 11/675,283, filed Feb. 15, 2007, corresponds to Japanese Patent Application No. 2006-038770, filed Feb. 16, 2006.

* cited by examiner

*Primary Examiner*—Helene Klemanski
(74) *Attorney, Agent, or Firm*—Banner & Witcoff, Ltd

(57) ABSTRACT

An ink for ink-jet recording is provided in which a copper phthalocyanine dye is used and a thiazole-based compound is also used. In this ink, the mildew resistant properties are not impaired. Furthermore, the ink exhibits excellent ozone resistance, and the formation of a precipitate is prevented in the ink although the thiazole-based compound is used. In the ink for ink-jet recording containing the copper phthalocyanine dye and the thiazole-based compound, the used copper phthalocyanine dye has a specific structure, and about 1 mol % to about 20 mol % of the total counter ions of the dye are ammonium ions or organic ammonium ions.

14 Claims, No Drawings

INK FOR INK-JET RECORDING

BACKGROUND OF THE INVENTION

1. Field of the Invention

The present invention relates to an ink for ink-jet recording.

2. Description of the Related Art

One of the important characteristics required of an ink for ink-jet recording is that the ink exhibits good ozone resistance. This is to prevent color fading (resulting in a reduction in image quality) of an ink-jet printed material caused by contact with any ozone present in the atmosphere. Meanwhile, a copper phthalocyanine-based dye has been employed as a coloring agent for a cyan ink for ink-jet recording. Such a dye has better light fastness when compared to magenta and yellow dyes but has a problem in that it exhibits insufficient ozone resistance.

Another important characteristic required for an ink for ink-jet recording is that the ink resists the growth of mildew. When mildew grows in an ink, the mildew itself acts as a foreign material. Therefore, the ejection stability of an ink containing mildew from nozzles of an ink-jet head decreases, causing clogging of the nozzles. Hence, a thiazole-based compound is added as a mildew proofing agent to an ink for ink-jet recording, irrespective of whether a copper phthalocyanine dye is employed as a coloring agent or not (U.S. Pat. No. 6,514,330B1).

However, in an ink for ink-jet recording to which a mildew proofing agent composed of a thiazole-based compound is added, although the growth of mildew is suppressed, a further problem exists in that the formation of a precipitate is observed. In particular, this tendency is noted when a copper phthalocyanine dye is employed as a coloring agent. Occasionally, in order to prevent corrosion of metal materials in an ink passage of an ink-jet head, an anticorrosive agent composed of a benzotriazole-based compound is additionally added to the ink. However, a problem exists in this case also in that the formation of a precipitate in the ink is observed.

SUMMARY OF THE INVENTION

The present invention has been developed to solve the problems inherent in the conventional technology. It is an object of the present invention to provide an ink for ink-jet recording in which, although a copper phthalocyanine dye is used and a thiazole-based compound is also used, the mildew resistant properties of the ink are not impaired, the ink exhibits excellent ozone resistance, and the formation of a precipitate in the ink is prevented.

The present inventors have found that the above object can be achieved by employing a copper phthalocyanine dye having a specific structure and by replacing a certain proportion of the total counter ions in the dye with ammonium ions or organic ammonium ions. Therefore, the invention has been completed.

Accordingly, the present invention provides an ink for ink-jet recording, containing a copper phthalocyanine dye and a thiazole-based compound, wherein the copper phthalocyanine dye has a structure represented by the general formula (1):

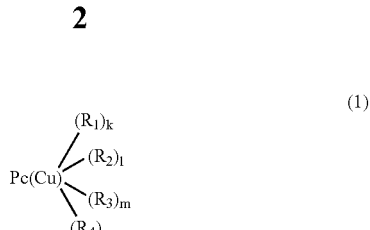

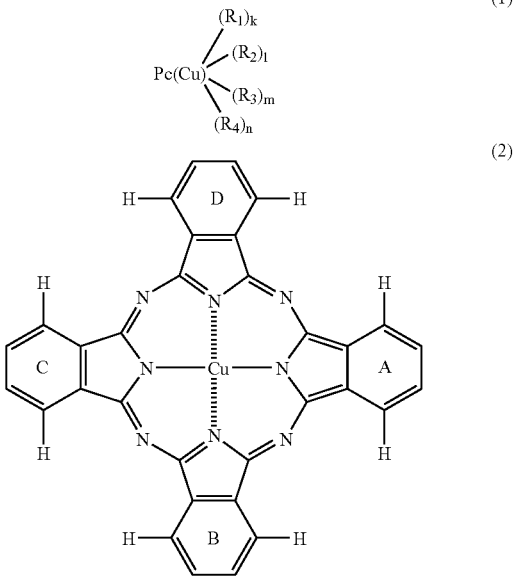

wherein, in the general formula (1), Pc(Cu) represents a copper phthalocyanine nucleus represented by the general formula (2), wherein, in the general formula (1), k is a number satisfying $0<k<8$; l is a number satisfying $0<l<8$;

m is a number satisfying $0 \leq m<8$; n is a number satisfying $0 \leq n<8$; k, l, m and n satisfy $4 \leq k+l+m+n \leq 8$; and $R_1$, $R_2$, $R_3$ and $R_4$ each independently represent a substituent selected from $—SO_2—R_a$, $—SO_2NR_bR_c$ and $—CO_2—R_a$, provided that $R_1$, $R_2$, $R_3$ and $R_4$ are not simultaneously the same, that at least one of $R_1$, $R_2$, $R_3$ and $R_4$ has an ionic hydrophilic group as a substituent, and that at least one or more of $R_1$, $R_2$, $R_3$ and $R_4$ is present on each of four benzene rings A, B, C and D of the copper phthalocyanine nucleus represented by the general formula (2), wherein $R_a$ represents a substituted or unsubstituted alkyl group; $R_b$ represents a hydrogen atom, or a substituted or unsubstituted alkyl group; and $R_c$ represents a substituted or unsubstituted alkyl group, and wherein about 1 mol % to about 20 mol % of total counter ions in the copper phthalocyanine dye are ammonium ions or organic ammonium ions.

DETAILED DESCRIPTION OF THE PREFERRED EMBODIMENTS

The ink for ink-jet recording of the present invention contains a copper phthalocyanine dye and a thiazole-based compound. In the present invention, the copper phthalocyanine dye has a structure represented by the general formula (1) above. Therefore, the ink exhibits good ozone resistance, although at present the reason for this is unclear. Furthermore, in the copper phthalocyanine dye employed in the present invention, about 1 mol % to about 20 mol %, and preferably about 1 mol % to about 15 mol %, of the total counter ions in the structure are ammonium ions ($NH_4^+$) or organic ammonium ions. This is because, when the amount of ammonium ions or organic ammonium ions is less than 1 mol % based on the total amount of the counter ions in the dye, the formation of a precipitate, which may be caused by the thiazole-based compound, cannot be suppressed, causing a reduction in ejection stability. Conversely, when the amount of ammonium ions or organic ammonium ions exceeds 20 mol %, the risk of forming a precipitate originating from a rubber member increases. However, when about 1 mol % to about 20 mol % of the total counter ions in the dye are ammonium ions or organic ammonium ions, the formation of a precipitate can be suppressed even when an anticorrosive agent composed of a benzotriazole-based compound is also employed in the ink.

In this instance, the organic ammonium ion is an ammonium ion in which one to four of the hydrogen atoms of $NH_4^+$ are replaced by alkyl groups (for example, methyl groups, ethyl groups and the like) or hydroxyalkyl groups (for example, hydroxyethyl groups and the like). Examples of the organic ammonium ion include, but not limited to, a monomethylammonium ion, a dimethylammonium ion, a trimethylammonium ion, a tetramethylammonium ion and the like.

In the ink for ink-jet recording of the present invention, the amount of the copper phthalocyanine dye having the structure represented by the general formula (1) is appropriately determined depending on the performance and required characteristics of the ink. Preferably, the amount of the dye based on the total weight of the ink for ink-jet recording is in the range of about 0.1 wt % to about 5 wt %. Furthermore, another dye may also be employed within the range which does not impair the effect of the invention.

A description will now be given of substituents $R_1$ to $R_4$, Pc(Cu), k, l, m and n in the general formula (1).

As described above, Pc(Cu) represents the copper phthalocyanine nucleus represented by the general formula (2). $R_1$, $R_2$, $R_3$ and $R_4$ each independently represent a substituent selected from $—SO_2—R_a$, $—SO_2NR_bR_c$ and $—CO_2—R_a$, provided that $R_1$, $R_2$, $R_3$ and $R_4$ are not simultaneously the same. Here, at least one of $R_1$, $R_2$, $R_3$ and $R_4$ has an ionic hydrophilic group as a substituent. Furthermore, at least one or more of $R_1$, $R_2$, $R_3$ and $R_4$ is present on each of the four benzene rings A, B, C and D of the copper phthalocyanine nucleus represented by the general formula (2). $R_a$ represents a substituted or unsubstituted alkyl group, and $R_b$ represents a hydrogen atom, or a substituted or unsubstituted alkyl group. Furthermore, $R_c$ represents a substituted or unsubstituted alkyl group. k is a number satisfying 0<k<8, l is a number satisfying 0<l<8, m is a number satisfying $0 \leq m < 8$, and n is a number satisfying $0 \leq n < 8$. In addition, k, l, m and n satisfy $4 \leq k+l+m+n \leq 8$.

Preferred examples of the substituted or unsubstituted alkyl groups $R_a$, $R_b$ and $R_c$ in the general formula (1) include, but not limited to, linear, branched and alicyclic alkyl groups having 1 to 12 carbon atoms. Particularly, a branched alkyl group is preferable because the solubility of the dye and the stability of the ink are improved. Particularly preferably, the alkyl group has an asymmetric carbon atom (in this case a racemic body is used).

Examples of the substituent of the substituted alkyl groups $R_a$, $R_b$ and $R_c$ include, but not limited to, a linear or branched alkyl group having 1 to 12 carbon atoms, a linear or branched aralkyl group having 7 to 18 carbon atoms, a linear or branched alkenyl group having 2 to 12 carbon atoms, a linear or branched alkynyl group having 2 to 12 carbon atoms, a linear or branched cycloalkyl group having 3 to 12 carbon atoms, a linear or branched cycloalkenyl group having 3 to 12 carbon atoms (among the above groups, branched chain groups are preferable in terms of improving the solubility of the dye and the stability of the ink, and groups having an asymmetric carbon atom are particularly preferable. Examples of such groups include, but not limited to, methyl, ethyl, propyl, isopropyl, sec-butyl, tert-butyl, 2-ethylhexyl, 2-methylsulfonylethyl, 3-phenoxypropyl, trifluoromethyl and cyclopentyl), a halogen atom (for example, a chlorine atom or a bromine atom), an aryl group (for example, phenyl, 4-tert-butylphenyl or 2,4-di-tert-amylphenyl), a heterocyclic group (for example, imidazolyl, pyrazolyl, triazolyl, 2-furil, 2-thienyl, 2-pyrimidinyl or 2-benzothiazolyl), a cyano group, a hydroxyl group, a nitro group, a carboxy group, an amino group, an alkyloxy group (for example, methoxy, ethoxy, 2-methoxyethoxy or 2-methanesulfonylethoxy), an aryloxy group (for example, phenoxy, 2-methylphenoxy, 4-tert-butylphenoxy, 3-nitrophenoxy, 3-tert-butyloxycarbamoylphenoxy or 3-methoxycarbamoyl), an acylamino group (for example, acetamide, benzamide or 4-(3-tert-butyl-4-hydroxyphenoxy) butaneamide), an alkylamino group (for example, methylamino, butylamino, diethylamino or methylbutylamino), an anilino group (for example, phenylamino or 2-chloroanilino), a ureide group (for example, phenylureide, methylureide or N,N-dibutylureide), a sulfamoylamino group (for example, N,N-dipropylsulfamoylamino), an alkylthio group (for example, methylthio, octylthio or 2-phenoxyethylthio), an arylthio group (for example, phenylthio, 2-butoxy-5-tert-octylphenylthio or 2-carboxyphenylthio), an alkyloxycarbonylamino group (for example, methoxycarbonylamino), a sulfonamide group (for example, methanesulfonamide, benzenesulfonamide or p-toluenesulfonamide), a carbamoyl group (for example, N-ethylcarbamoyl or N,N-dibutylcarbamoyl), a sulfamoyl group (for example, N-ethylsulfamoyl, N,N-dipropylsulfamoyl or N-phenylsulfamoyl), a sulfonyl group (for example, methanesulfonyl, octanesulfonyl, benzenesulfonyl or toluenesulfonyl), an alkyloxycarbonyl group (for example, methoxycarbonyl or butyloxycarbonyl), a heterocyclic oxy group (for example, 1-phenyltetrazole-5-oxy or 2-tetrahydropyranyloxy), an azo group (for example, phenylazo, 4-methoxyphenylazo, 4-pivaloylaminophenylazo or 2-hydroxy-4-propanoylphenylazo), an acyloxy group (for example, acetoxy), a carbamoyloxy group (for example, N-methylcarbamoyloxy or N-phenylcarbamoyloxy), a silyloxy group (for example, trimethylsilyloxy or dibutylmethylsilyloxy), an aryloxycarbonylamino group (for example, phenoxycarbonylamino), an imide group (for example, N-succinimide or N-phthalimide), a heterocyclic thio group (for example, 2-benzothiazolylthio, 2,4-diphenoxy-1,3,5-triazole-6-thio or 2-pyridylthio), a sulfinyl group (for example, 3-phenoxypropylsulfinyl), a phosphonyl group (for example, phenoxyphosphonyl, octyloxyphosphonyl or phenylphosphonyl), an aryloxycarbonyl group (for example, phenoxycarbonyl), an acyl group (for example, acetyl, 3-phenylpropanoyl or benzoyl) and an ionic hydrophilic group (for example, a carboxyl group, a sulfo group, a phosphono group or a quaternary ammonium group). Of these, a hydroxyl group, a group having an ether bond or an ester bond, a cyano group and a sulfoneamide group are particularly preferable because the association properties of the dye are enhanced to improve durability. In addition to the above, the substituent of the substituted alkyl groups $R_a$, $R_b$ and $R_c$ may have a halogen atom or an ionic hydrophilic group.

Specific examples of the substituted or unsubstituted alkyl groups $R_a$, $R_b$ and $R_c$ include, but not limited to, a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, 4-sulfobutyl group and the like.

One preferred embodiment of the copper phthalocyanine dye is a dye represented by the general formula (1), wherein $R_1$, $R_2$, $R_3$ and $R_4$ are substituents represented by —$SO_2$—$R_a$, wherein $R_a$ is a substituted or unsubstituted alkyl group, provided that not all the four substituted or unsubstituted alkyl groups $R_a$ in $R_1$, $R_2$, $R_3$ and $R_4$ are completely identical. Here, "not all the four groups $R_a$ being completely identical" means that, provided that at least one of the four groups $R_a$ is a substituted alkyl group having an ionic hydrophilic group, at least two types of $R_a$ are present.

A further preferred embodiment of the copper phthalocyanine dye is a dye represented by the general formula (1), wherein k is a number satisfying $0<k<4$; l is a number satisfying $0<l<4$; m is a number satisfying $0\leq m<4$; n is a number satisfying $0\leq n<4$; and the sum of k, l, m and n is 4.

Preferred specific examples of the copper phthalocyanine dye include compounds represented by chemical formulas (1-A) to (1-E) below. Although not explicitly noted in each of the formulas, about 1 mol % to about 20 mol % of the total counter ions are ammonium ions or organic ammonium ions.

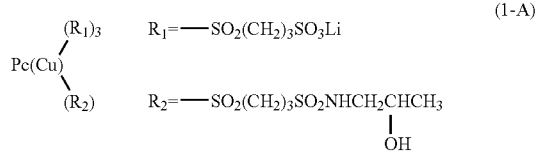
(1-A)

The compound represented by the chemical formula (1-A) is an embodiment of the copper phthalocyanine dye, wherein, in the general formula (1), $R_1$ is a lithium sulfonato propylsulfonyl group; $R_2$ is an N-(2-hydroxypropyl) sulfamoylpropylsulfonyl group; k is 3; l is 1; and both m and n are 0.

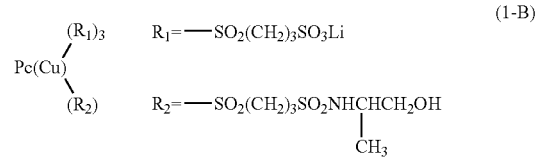
(1-B)

The compound represented by the chemical formula (1-B) is another embodiment of the copper phthalocyanine dye, wherein, in the general formula (1), $R_1$ is a lithium sulfonato propylsulfonyl group; $R_2$ is an N-(2-hydroxyisopropyl) sulfamoylpropylsulfonyl group; k is 3; l is 1; and both m and n are 0.

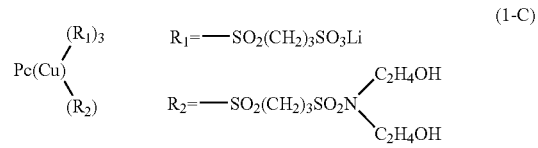
(1-C)

The compound represented by the chemical formula (1-C) is yet another embodiment of the copper phthalocyanine dye, wherein, in the general formula (1), $R_1$ is a lithium sulfonato propylsulfonyl group; $R_2$ is an N,N-(di(2-hydroxyethyl)) sulfamoylpropylsulfonyl group; k is 3; l is 1; and both m and n are 0.

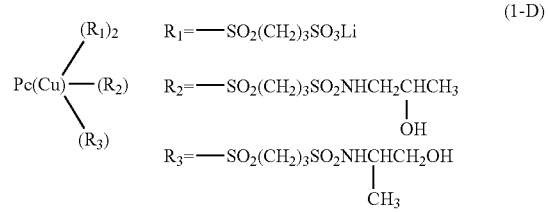
(1-D)

The compound represented by the chemical formula (1-D) is another embodiment of the copper phthalocyanine dye, wherein, in the general formula (1), $R_1$ is a lithium sulfonato propylsulfonyl group; $R_2$ is an N-(2-hydroxypropyl) sulfamoylpropylsulfonyl group; $R_3$ is an N-(2-hydroxyisopropyl) sulfamoylpropylsulfonyl group; k is 2; l is 1; m is 1; and n is 0.

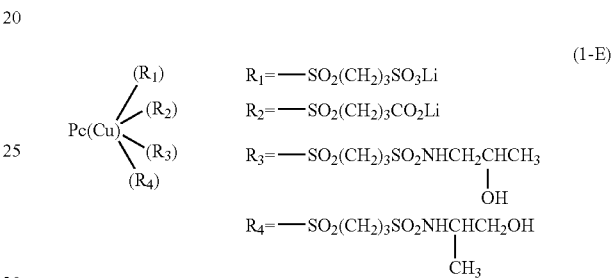
(1-E)

The compound represented by the chemical formula (1-E) is yet another embodiment of the copper phthalocyanine dye, wherein, in the general formula (1), $R_1$ is a lithium sulfonato propylsulfonyl group; $R_2$ is a lithium carboxylato propylsulfonyl group; $R_3$ is an N-(2-hydroxypropyl) sulfamoylpropylsulfonyl group; $R_4$ is an N-(2-hydroxyisopropyl) sulfamoylpropylsulfonyl group; and k, l, m and n are 1.

A production method of the copper phthalocyanine dye represented by the general formula (1) will now be described below. Generally, when an unsubstituted phthalocyanine compound is sulfonated according to a method described in Published Japanese Translation of PCT International Application No. 2002-526589 (WO00/17275), a sulfo group can be relatively easily introduced into the phthalocyanine nucleus. When a sulfonated phthalocyanine compound is employed as a water soluble dye, a salt of the sulfo group is formed using an alkali metal hydroxide such as sodium hydroxide, and the obtained sulfonate can be used as a dye without further treatment. In this case, the sulfonation can occur at any position in the phthalocyanine nucleus, and it is difficult to control the number of introduced sulfo groups. Therefore, when sulfonation is carried out under reaction conditions in which the position and number of introduced sulfo groups are not taken into account and in which only the ease of sulfonation is taken into account, the position and number of the sulfo groups introduced into the product are difficult to identify. Thus, a mixture is obtained in which the number of substituents and the substitution positions are not uniform. Hence, in order to improve the ozone resistance of the copper phthalocyanine dye, any product having poor ozone resistance must be prevented from being mixed. Therefore, it is essential that a specific substituent be introduced into a phthalic acid derivative in advance to synthesize both the copper phthalocyanine from this substituted phthalic acid derivative and a copper derivative such as $CuCl_2$. A method for synthesizing copper phthalocyanine from a phthalic acid derivative and a copper derivative is described in Japanese Patent Application Laid-Open No. 2000-303009 and the like.

alkyl group, and $R_b$ represents a hydrogen atom or a substituted or unsubstituted alkyl group. Furthermore, $R_c$ represents a substituted or unsubstituted alkyl group.

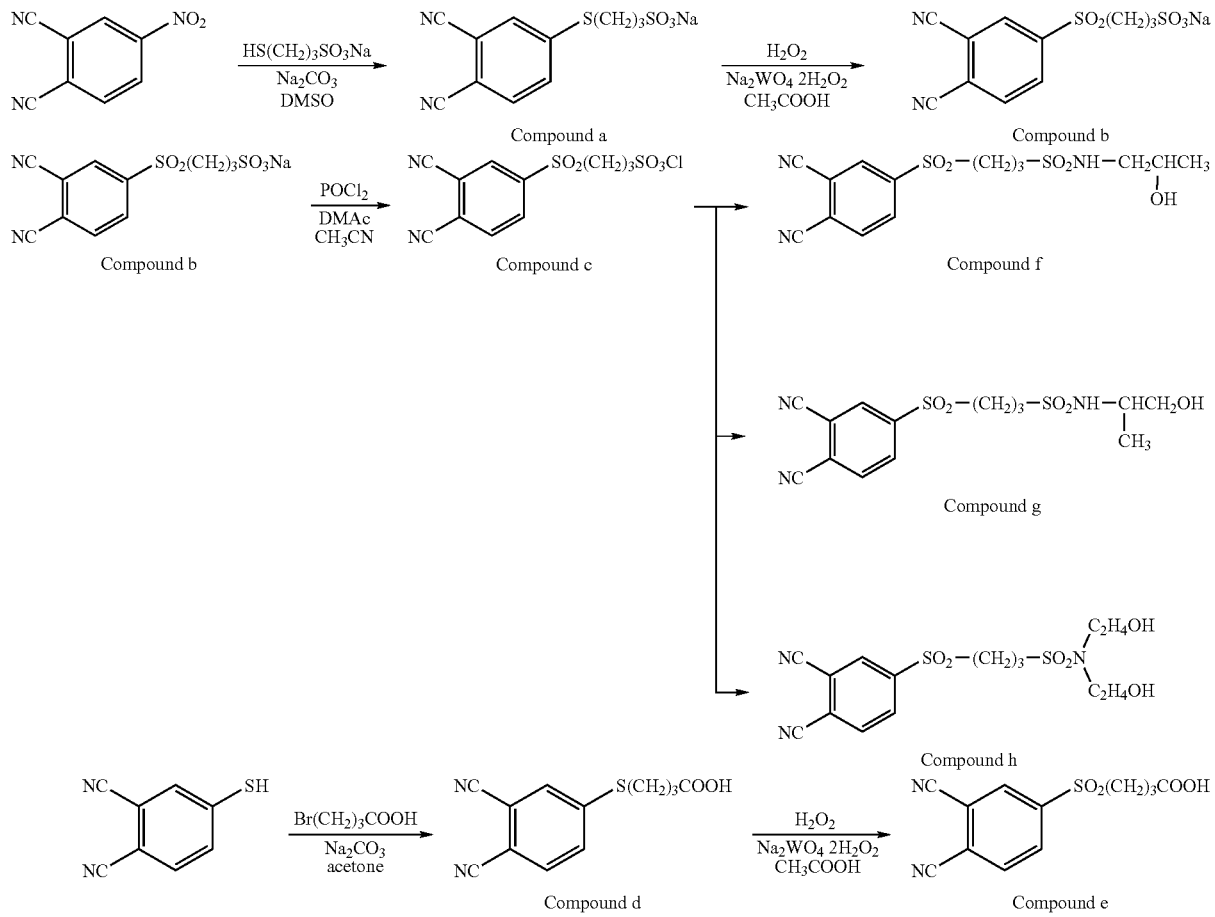

An example of the production method of the copper phthalocyanine dye represented by the general formula (1) is described below. In this case, a substituted phthalic acid derivative can be produced by the following scheme detailed below.

As a phthalic acid derivative serving as a raw material, substituted phthalonitrile, substituted diiminoisoindoline, substituted phthalic acid diamide, substituted phtalimide, substituted phthalic acid and a salt thereof, substituted phthalic anhydride and the like may be employed.

The substituent of the substituted phthalic acid derivatives is a soluble group or a precursor thereof. The soluble group is a substituent which imparts solubility to a copper phthalocyanine dye. When a soluble group imparts water solubility to a copper phthalocyanine dye, the soluble group is a hydrophilic group. Examples of the hydrophilic group include, but not limited to, an ionic hydrophilic group and a substituent substituted by an ionic hydrophilic group. The precursor of a soluble group is a substituent which can be converted to a soluble group through a reaction after a phthalocyanine ring is formed. Preferably, the substituent of the substituted phthalic acid derivatives is a substituent selected from —$SO_2$—$R_a$, —$SO_2NR_bR_c$ and —$CO_2$—$R_a$. In this instance, $R_a$ represents a substituted or unsubstituted The phthalic acid derivatives are typified by compounds a to h. A phthalic acid derivative is mixed with a metal derivative such as $CuCl_2$ in a molar ratio (metal derivative: phthalic acid derivative) of 3:1 to 6:1. Then, the mixture is reacted at a temperature ranging from 80° C. to 300° C. in the presence of an organic solvent having a boiling point of 80° C. or higher and preferably 130° C. or higher. When the reaction temperature is lower than 80° C., the reaction rate may be significantly decreased. Conversely, when the reaction temperature exceeds 300° C., the phthalocyanine dye obtained may be decomposed. In this case, the reaction time is preferably 2 hours to 20 hours. When the reaction time is less than 2 hours, a large amount of the raw materials may remain unreacted. Conversely, when the reaction time exceeds 20 hours, the phthalocyanine dye obtained may be decomposed. This reaction may be carried out in the presence of a catalyst such as 1,8-diazabicyclo [5.4.0]-7-undecene (DBU) or ammonium molybdate and the like. Replacement can be carried out, for example, according to the following method: the original cation is removed through dialysis; and then a monovalent metal cation is added (for example, an alkali metal hydroxide is added). After completion of the reaction, the reaction product containing the copper phthalocyanine dye represented by the general formula (1) without containing any ammonium ion and any organic ammonium ion is treated with an aqueous ammonia or an aqueous solution of organic ammonium hydroxide so that about 1 mol % to about 20 mol % of the total counter ions in the structure of the copper phthalocyanine dye are ammonium ions or organic ammonium ions. The copper phthalocyanine dye represented by the general formula (1) which has desired ozone resistance can be obtained.

The amount of the counter ions in the copper phthalocyanine dye can be measured by means of a commercial cation chromatography apparatus.

The ink for ink-jet recording of the present invention contains a thiazole-based compound. The thiazole-based compound serves as a mildew proofing agent. Examples of the thiazole-based compound include, but not limited to, benzisothiazolin, isothiazolin, 1,2-benzisothiazolin-3-one, 5-chloro-2-methyl-4-isothiazolin-3-one, 2-(thiocyanomethylthio) benzthiazole, 2-mercaptobenzthiazole, 3-allyloxy-1,2-benzisothiazole-1,1-oxide and the like. Furthermore, a Proxel series (such as BDN, BD20, GXL, LV, XL2, Ultra 10 and the like) manufactured by and available from Arch Chemicals, Inc. may be employed as the thiazole-based mildew proofing agent.

When the amount of the thiazole-based compound in the ink for ink-jet recording is too low, the mildew proofing effects are not observed. When the amount is too large, the risk of formation of a precipitate increases. Therefore, the amount of the thiazole-based compound based on the total amount of the ink for ink-jet recording is usually in the range of about 10 ppm to about 500 ppm and often in the range of about 100 ppm to about 500 ppm.

Preferably, the ink for ink-jet recording of the present invention further contains a benzotriazole-based compound in order to prevent corrosion of the metal material (particularly a 42 alloy (a nickel-iron alloy containing 42% nickel)) constituting the ink-jet head. In this instance, the corrosion may be caused due to contact between the ink and the metal material constituting the ink-jet head. Examples of the benzotriazole-based compound include, but not limited to, 1H-benzotriazole, 4-methyl-1H-benzotriazole, 5-methyl-1H-benzotriazole, sodium and potassium salts thereof and the like.

When the amount of the benzotriazole-based compound in the ink for ink-jet recording is too low, the anticorrosion effects are not observed. When the amount is too large, the risk of formation of a precipitate increases. Therefore, the amount of the benzotriazole-based compound based on the total amount of the ink for ink-jet recording is usually in the range of about 0.5 wt % or less and often in the range of about 0.01 wt % to about 0.2 wt %.

A description will now be given of water and a water soluble organic solvent contained in the ink for ink-jet recording of the present invention.

The water employed in the present invention is preferably ion exchanged water containing a small amount of salts. The ink for ink-jet recording contains various components in predetermined amounts, and the balance is made up with water. Therefore, the amount of water used depends on the amounts of the other components. The amount of water based on the total amount of the ink for ink-jet recording is normally in the range of about 10 wt % to about 90 wt % and is often in the range of about 40 wt % to about 80 wt %.

Examples of the water soluble organic solvent employed in the present invention include, but not limited to, a humectant for mainly preventing drying of ink at the end portion of the nozzles of an ink-jet head and a penetrant for mainly increasing drying speed on paper.

Examples of the humectant include, but not limited to: lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; polyalkylene glycols such as polyethylene glycol, polypropylene glycol and the like; alkylene glycols such as ethylene glycol, propylene glycol, butylene glycol, diethylene glycol, triethylene glycol, dipropylene glycol, tripropylene glycol, thiodiglycol, hexylene glycol and the like; glycerin; 2-pyrrolidone; N-methyl-2-pyrrolidone; 1,3-dimethyl-2-imidazolidinone; and the like. Of these, polyalcohols such as alkylene glycols, glycols and the like are suitable.

The amount of the humectant in the ink for ink-jet recording is generally in the range of about 95 wt % or less, often in the range of about 10 wt % to about 80 wt %, and more often in the range of about 10 wt % to about 50 wt % based on the total amount of the ink for ink-jet recording.

Furthermore, examples of the penetrant include, but not limited to, glycol-based ethers such as ethylene glycol methyl ether, ethylene glycol ethyl ether, ethylene glycol propyl ether, diethylene glycol methyl ether, diethylene glycol ethyl ether, diethylene glycol propyl ether, triethylene glycol methyl ether, triethylene glycol ethyl ether, triethylene glycol propyl ether, propylene glycol methyl ether, propylene glycol ethyl ether, propylene glycol propyl ether, dipropylene glycol methyl ether, dipropylene glycol ethyl ether, dipropylene glycol propyl ether, tripropylene glycol methyl ether, tripropylene glycol ethyl ether, tripropylene glycol propyl ether and the like.

The amount of the penetrant in the ink for ink-jet recording is generally in the range of about 20 wt % or less, often in the range of about 0.1 wt % to about 15 wt % and more often in the range of about 1 wt % to about 10 wt % based on the total amount of the ink for ink-jet recording. It should be noted that, when the amount of the penetrant is too large, the penetrability of ink to paper becomes excessively high to cause blurring.

The ink for ink-jet recording of the present invention may contain other conventionally known additives including: viscosity modifiers such as polyvinyl alcohol, cellulose, water soluble resin and the like; surface tension modifiers; and the like in accordance with need.

The ink for ink-jet recording of the present invention can be prepared by uniformly mixing the copper phthalocyanine dye, the mildew proofing agent, water, the water soluble organic solvents and, if necessary, other various additives by means of routine methods.

EXAMPLES

Examples 1 to 7 and Comparative Examples 1 to 4

The components of each of ink compositions shown in Table 1 were mixed uniformly, thereby preparing each ink for ink-jet recording. Here, dye A corresponds to a compound which is represented by the chemical formula (1-A) and in which 2 mol % of the total counter ions are ammonium ions. Dye B corresponds to a compound which is represented by the chemical formula (1-B) and in which 5 mol % of the total counter ions are ammonium ions. Dye C corresponds to a compound which is represented by chemical formula (1-C) and in which 10 mol % of the total counter ions are ammonium ions. Dye D corresponds to a compound which is represented by the chemical formula (1-D) and in which 15 mol % of the total counter ions are ammonium ions. Dye E corresponds to a compound which is represented by the chemical formula (1-E) and in which 20 mol % of the total counter ions are ammonium ions. Dye F corresponds to a compound which is represented by the chemical formula (1-A) and in which none of the total counter ions are ammonium ions. Dye G corresponds to a compound which is represented by the chemical formula (1-C) and in which 0.3 mol % of the total counter ions are ammonium ions. Dye H corresponds to a compound which is represented by the chemical formula (1-E) and in which 40 mol % of the total counter ions are ammonium ions. The rest of the counter ions are monovalent metal ions such as lithium ions, sodium ions, potassium ions and the like.

Ammonium ions present in the dyes was measured using a DX-500 series (product of Nippon Dionex K.K.). During the measurement, an IonPac® CG16 column (product of Nippon Dionex K.K.) was employed as a separation column. The temperature of the thermostatic chamber was 45° C., and a CMMS III suppressor (4 mm, product of Nippon Dionex K.K.) was employed as a suppressor.

<<Evaluation>>

For each of the inks for ink-jet recording, the following evaluations were performed: storage stability (using filtration test), ejection stability, long-term ejection stability, mildew resistant properties, anticorrosive properties, rubber precipitating properties, ozone resistance and an OD (Optical Density) value reduction ratio measured on a patch having an initial OD value of 1.0. A description of each of the evaluation tests is given below. The obtained results are shown in Table 1.

<Storage Stability (Filtration Test)>

Each of the inks for ink-jet recording (100 mL) was sealed in a glass container and left to stand in a thermostatic chamber at 60° C. for 14 days. Subsequently, 50 ml of the ink was filtrated through a hydrophilic membrane filter having a pore size of 0.2 µm, and the presence or absence of a precipitate on the membrane filter was observed visually and under a microscope. The storage stability was evaluated according to the following criteria.

A: A precipitate is not present on the membrane filter.

C: A precipitate is present on the membrane filter.

<Ejection Stability>

Each of the inks for ink-jet recording was filled into a desired ink cartridge, and the ink cartridge was attached to a digital multifunction device equipped with an ink-jet printer (DCP-110C, product of Brother Industries, Ltd.). Then, 100 million dots (about 30 thousand sheets) were continuously printed, and the ejection stability was evaluated according to the following criteria.

AA: No non-ejection and ejection bending occur during continuous printing.

A: Non-ejection or ejection bending occurs to a small extent during continuous printing. The non-ejection or ejection bending is rectified by repeating purging at most five times.

C: Non-ejection and ejection bending occurs to a large extent during continuous printing. Neither the non-ejection nor ejection bending is rectified in a short time.

<Long-Term Ejection Stability>

After the above detailed ejection stability test was completed, the digital multifunction device equipped with an ink-jet printer (DCP-110C) with the ink cartridge attached thereto was left to stand in a thermostatic chamber at 60° C. for two weeks. Subsequently, 100 million dots (about 30 thousand sheets) were continuously printed again, and the long-term ejection stability was evaluated according to the following criteria.

AA: No non-ejection and ejection bending occur during continuous printing.

A: Non-ejection or ejection bending occurs to a small extent during continuous printing. The non-ejection or ejection bending is rectified by repeating purging at most five times.

C: Non-ejection and ejection bending occurs to a large extent during continuous printing. Neither the non-ejection nor ejection bending is rectified in a short time.

<Mildew Resistant Properties>

The cap of each of the food stamps used for bacterial test (for viable bacterium and for fungi, products of NISSUI PHARMACEUTICAL CO., LTD.) was removed, and a sufficient amount of one of the inks for ink-jet recording was applied to the surface of each of the agar mediums. Each of the food stamps was left to stand for 10 hours without the cap to facilitate the adhesion of the bacteria. Subsequently, the cap was placed back on. For the food stamps used to provide a viable bacterium, cultivation was carried out in a thermostatic chamber at 36° C. for two days. For the food stamps used for fungi, cultivation was carried out in a thermostatic chamber at 23° C. for five days. Each of the food stamps was observed visually, and the mildew resistant properties were evaluated according to the following criteria.

A: No growth of mildew is observed.

C: The growth of mildew is observed.

<Anticorrosive Properties>

In order to prepare metal member sample pieces, a metal material employed in an ink-jet head member was cut into a strip shape with dimensions of 50 mm length, 10 mm width and 2 mm thickness. The metal member sample pieces were immersed in 10 mL of each of the inks for ink-jet recording in sealed containers and were left to stand in a thermostatic chamber at 60° C. for two weeks. Subsequently, the immersed metal member sample pieces were removed and observed visually and under a microscope. The anticorrosive properties were evaluated according to the following criteria.

AA: The sample piece is not stained and not corroded.

A: The sample piece is slightly stained but not corroded.

C: The sample piece is stained and corroded.

<Rubber Precipitating Properties>

A rubber sample was cut into a strip shape with dimensions of 50 mm length, 10 mm width and 2 mm thickness was immersed in 10 mL of each of the inks for ink-jet recording in a sealed container and was left to stand in a thermostatic chamber at 60° C. for two weeks. Subsequently, the immersed sample was removed, and the whole amount of the ink after the removal of the sample was filtrated through an electroformed filter (with a pore size of 13 µm and an effective filtration area of 8 cm$^2$) to measure the time required for the filtration of each ink. In addition to this, as a control, each of the inks to which a rubber sample was not added was left to stand under the same conditions as above (at 60° C. for two weeks) and was filtrated through an electroformed filter having the same specification as above to measure the time required for the filtration (to provide the reference time). For each of the inks in which a rubber sample was immersed, the percentage of time required for the filtration with respect to the reference time was determined. The rubber precipitating properties were evaluated according to the following criteria. Furthermore, the electroformed filters after filtration were observed under a microscope, and there was a trend that the larger the percentage of time required for the filtration with respect to the reference time, the larger the amount of a precipitate observed.

AA: The required filtration time is less than 130% of the reference time.

A: The required filtration time is at least 130% and less than 200% of the reference time.

B: The required filtration time is at least 200% and less than 400% of the reference time.

C: The required filtration time is at least 400% of the reference time.

<Ozone Resistance>

Each of the inks for ink-jet recording was filled into a desired ink cartridge, and the ink cartridge was attached to a digital multifunction device equipped with an ink-jet printer (DCP-110C, product of Brother Industries, Ltd.) to perform the printing evaluation. First, as an evaluation sample, a gradation sample of each cyan ink was printed on photo glossy paper (Model No. BP60GLA, product of Brother Industries, Ltd.) to prepare a patch having an initial OD value of 1.0. This patch was then subjected to an ozone resistance evaluation test using an Ozone Weather Meter OMS-H (product of Suga Test Instruments Co., Ltd.). That is, the patch was left to stand under the conditions of an ozone concentration of 1 ppm, a chamber temperature of 24° C. and a chamber humidity of 60% RH for 40 hours. Specifically, the color patch printed with each cyan ink and having an OD value of 1.0 before the test was then measured for an OD value after the ozone resistance evaluation test was completed. The OD value was measured by means of a Spectrolino (product of Gretag Macbeth) (light source: $D_{65}$; viewing angle: 2°; Status A). The obtained measurement value (the OD value after the test) was substituted into the equation detailed below to determine an OD value reduction ratio with respect to the OD value (1.0) before the test.

$$(OD \text{ value reduction ratio}) = \{1.0(OD \text{ value before test}) - (OD \text{ value after test})\} / \{1.0(OD \text{ value before test})\} * 100 \quad \text{(Equation I)}$$

The obtained OD value reduction ratio was then evaluated according to the criteria below. When the OD value reduction ratio is less than 30%, the ozone resistance performance for general use is determined to be at an acceptable level.

AA: The OD value reduction ratio is less than 20%.

A: The OD value reduction ratio is 20% or more and less than 30%.

B: The OD value reduction ratio is 30% or more and less than 40%.

C: The OD value reduction ratio is 40% or more.

<Overall Evaluation>

Based on the above evaluation results, an overall evaluation was conducted according to the following criteria.

G: All of the evaluation results are AA or A.

NG: The evaluation results contain B or C.

TABLE 1

| | Ex. 1 | Ex. 2 | Ex. 3 | Ex. 4 | Ex. 5 | Ex. 6 | Ex. 7 | Com. Ex. 1 | Com. Ex. 2 | Com. Ex. 3 | Com. Ex. 4 |
|---|---|---|---|---|---|---|---|---|---|---|---|
| Ink composition (wt %) | | | | | | | | | | | |
| Dye A (ammonium ion ratio *[1] = 2 mol %) | 4.0 | — | — | — | — | — | 5.0 | — | — | — | — |
| Dye B (ammonium ion ratio *[1] = 5 mol %) | — | 0.5 | — | — | — | 4.0 | — | — | — | — | 4.0 |
| Dye C (ammonium ion ratio *[1] = 10 mol %) | — | — | 1.0 | — | — | — | — | — | — | — | — |
| Dye D (ammonium ion ratio *[1] = 15 mol %) | — | — | — | 2.0 | — | — | — | — | — | — | — |
| Dye E (ammonium ion ratio *[1] = 20 mol %) | — | — | — | — | 3.0 | — | — | — | — | — | — |
| Dye F (ammonium ion ratio *[1] = 0 mol %) | — | — | — | — | — | — | — | 4.0 | — | — | — |
| Dye G (ammonium ion ratio *[1] = 0.3 mol %) | — | — | — | — | — | — | — | — | 4.0 | — | — |
| Dye H (ammonium ion ratio *[1] = 40 mol %) | — | — | — | — | — | — | — | — | — | 4.0 | — |
| Glycerin | 27.0 | 27.0 | 27.0 | 27.0 | 27.0 | 27.0 | 27.0 | 27.0 | 27.0 | 27.0 | 27.0 |
| Triethylene glycol butyl ether | 5.0 | 5.0 | 5.0 | 5.0 | 5.0 | 5.0 | 5.0 | 5.0 | 5.0 | 5.0 | 5.0 |
| Benzotriazole | — | 0.1 | 0.1 | 0.1 | 0.1 | 0.1 | 0.1 | 0.1 | 0.1 | 0.1 | — |
| OLFINE ® E1010 *[2] | 0.2 | 0.2 | 0.2 | 0.2 | 0.2 | 0.2 | 0.2 | 0.2 | 0.2 | 0.2 | 0.2 |
| Proxel XL-2(S) *[3] | 0.2 | 0.2 | 0.2 | 0.2 | 0.2 | 0.2 | 0.2 | 0.2 | 0.2 | 0.2 | — |
| Water | | | | | | Balance | | | | | |
| Evaluation | | | | | | | | | | | |
| Storage stability (filtration test) | A | A | A | A | A | A | A | C | C | A | A |
| Ejection stability | A | AA | AA | AA | AA | AA | AA | C | C | AA | A |
| Long-term ejection stability | A | AA | AA | AA | A | AA | AA | C | C | C | C |
| Mildew resistant properties | A | A | A | A | A | A | A | A | A | A | C |
| Anticorrosive properties | A | AA | AA | AA | AA | AA | AA | AA | AA | AA | A |
| Rubber precipitating properties | AA | AA | AA | AA | A | AA | AA | AA | AA | C | AA |
| Ozone resistance | AA | AA | AA | AA | AA | AA | AA | AA | AA | AA | AA |
| OD value reduction ratio (initial OD = 1.0) (%) | 8 | 9 | 7 | 7 | 7 | 8 | 6 | 7 | 8 | 6 | 7 |
| Overall evaluation | G | G | G | G | G | G | G | NG | NG | NG | NG |

*[1]: Ratio of ammonium ions to total counter ions in dye
*[2]: Acetylene glycol-based surfactant (product of Nissin Chemical Industry Co., Ltd.)
*[3]: Active ingredient = 1,2-benzisothiazolin-3-one; active ingredient concentration = 10 wt %; Mildewproofing agent (product of Arch Chemicals, Inc.)

The ink for ink-jet recording of Example 1 (where the amount of dye=4.0 wt %) contains a thiazole-based compound. In this ink, the dye A is employed in which 2 mol % of the total counter ions in the dye structure are ammonium ions and which exhibits excellent ozone resistance. Therefore, the ink exhibits excellent ozone resistance and excellent mildew resistant properties. In addition to this, although the ink contains the thiazole-based compound, a precipitate was not formed, and thus the ink could be stably ejected all the time. Furthermore, the attacking properties on rubber were low, and thus the formation of a precipitate originating from the rubber member was prevented. Also, because the ink for ink-jet recording of Example 1 does not contain a benzotriazole-based compound, the metal member was found to be stained only slightly in the test for anticorrosive properties and did not suffer from corrosion. Therefore, this ink did not cause any practical problems.

The ink for ink-jet recording of Example 2 (where the amount of dye=0.5 wt %) contains a thiazole-based compound and a benzotriazole-based compound. In this ink, the dye B is employed in which 5 mol % of the total counter ions in the dye structure are ammonium ions and which exhibits excellent ozone resistance. Therefore, the ink exhibits excellent ozone resistance, excellent mildew resistant properties and excellent anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

The ink for ink-jet recording of Example 3 (where the amount of dye=1.0 wt %) contains a thiazole-based compound and a benzotriazole-based compound. In this ink, the dye C is employed in which 10 mol % of the total counter ions in the dye structure are ammonium ions and which exhibits excellent ozone resistance. Therefore, the ink exhibits excellent ozone resistance, excellent mildew resistant properties and excellent anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

The ink for ink-jet recording of Example 4 (where the amount of dye=2.0 wt %) contains a thiazole-based compound and a benzotriazole-based compound. In this ink, the dye D is employed in which 15 mol % of the total counter ions in the dye structure are ammonium ions and which exhibits excellent ozone resistance. Therefore, the ink exhibits excellent ozone resistance, excellent mildew resistant properties and excellent anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

The ink for ink-jet recording of Example 5 (where the amount of dye=3.0 wt %) contains a thiazole-based compound and a benzotriazole-based compound. In this ink, the dye E is employed in which 20 mol % of the total counter ions in the dye structure are ammonium ions and which exhibits excellent ozone resistance. Therefore, the ink exhibits excellent ozone resistance, excellent mildew resistant properties and excellent anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

The ink for ink-jet recording of Example 6 (where the amount of dye=4.0 wt %) contains a thiazole-based compound and a benzotriazole-based compound. In this ink, the dye B is employed in which 5 mol % of the total counter ions in the dye structure are ammonium ions and which exhibits excellent ozone resistance. Therefore, the ink exhibits excellent ozone resistance, excellent mildew resistant properties and excellent anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

The ink for ink-jet recording of Example 7 (where the amount of dye=5.0 wt %) contains a thiazole-based compound and a benzotriazole-based compound. In this ink, the dye A is employed in which 2 mol % of the total counter ions in the dye structure are ammonium ions and which exhibits excellent ozone resistance. Therefore, the ink exhibits excellent ozone resistance, excellent mildew resistant properties and excellent anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

The ink for ink-jet recording of Comparative Example 1 (where the amount of dye=4.0 wt %) contains a thiazole-based compound and a benzotriazole-based compound. In this ink, the dye F is employed which is a dye with excellent ozone resistance but in which none of the counter ions in the dye structure are ammonium ions. Therefore, although the ink exhibits excellent ozone resistance, excellent mildew resistant properties and excellent anticorrosive properties, the formation of a precipitate probably originating from the thiazole-based compound and the benzotriazole-based compound was observed. Thus, the results of storage stability, ejection stability and long-term ejection stability were unsatisfactory. However, the attacking properties on rubber were low.

The ink for ink-jet recording of Comparative Example 2 (where the amount of dye=4.0 wt %) contains a thiazole-based compound and a benzotriazole-based compound. In this ink, the dye G is employed which is a dye with excellent ozone resistance but which contains ammonium ions in an amount of only 0.3 mol % based on the total counter ions in the dye structure. Therefore, although the ink exhibits excellent ozone resistance, excellent mildew resistant properties and excellent anticorrosive properties, the formation of a precipitate probably originating from the thiazole-based compound and the benzotriazole-based compound was observed. Thus, the results of storage stability, ejection stability and long-term ejection stability were unsatisfactory. However, the attacking properties on rubber were low.

The ink for ink-jet recording of Comparative Example 3 (where the amount of dye=4.0 wt %) contains a thiazole-based compound and a benzotriazole-based compound. In this ink, the dye H is employed which exhibits excellent ozone resistance and contains ammonium ions in an amount of 40 mol % based on the total counter ions in the dye structure. Therefore, the ink exhibits excellent ozone resistance, excellent mildew resistant properties and excellent anticorrosive properties, and the results of the storage stability and ejection stability were favorable. However, the attacking properties on the rubber member were strong, and thus a precipitate originating from the rubber member was formed. Therefore, the long-term ejection stability was unsatisfactory.

In the ink for ink-jet recording of Comparative Example 4 (where the amount of dye=4.0 wt %), the dye C is employed in which 10 mol % of the total counter ions in the dye structure are ammonium ions and which exhibits excellent ozone resistance. Therefore, the ink has excellent ozone resistance. In addition to this, the attacking properties on the rubber member were low, and thus a precipitate originating from the rubber member was not observed. However, because a thiazole-based compound was not included in the ink, mildew was observed in the ink, and thus the long-term ejection stability was unsatisfactory. Furthermore, because the ink for ink-jet recording of Comparative Example 4 does not contain a benzotriazole-based compound, the metal member was found to be stained slightly in the test for anticorrosive properties but did not suffer from corrosion. Therefore, this ink did not cause any practical problems.

The entire disclosure of the specification, claims and summary of Japanese Patent Application No. 2006-38769 filed on Feb. 16, 2006 is hereby incorporated by reference.

What is claimed is:

1. An ink for ink-jet recording, comprising a copper phthalocyanine dye and a thiazole-based compound, wherein the copper phthalocyanine dye has a structure represented by the general formula (1):

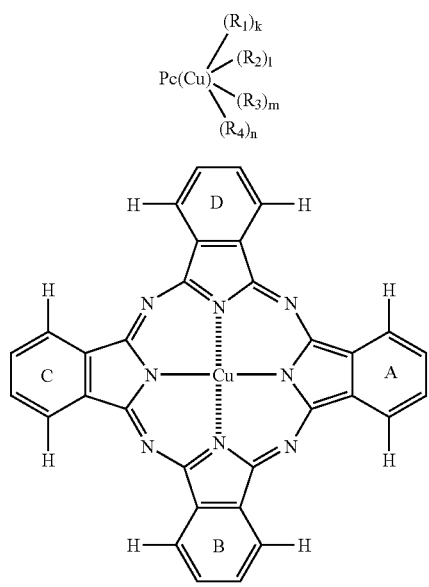

wherein, in the general formula (1), Pc(Cu) represents a copper phthalocyanine nucleus represented by the above general formula (2), wherein, in the general formula (1), k is a number satisfying 0<k<8; l is a number satisfying 0<l<8; m is a number satisfying 0≦m<8; n is a number satisfying 0≦n<8; k, l, m and n satisfy 4≦k+l+m+n≦8; and $R_1$, $R_2$, $R_3$ and $R_4$ each independently represent a substituent selected from the group consisting of —$SO_2$—$R_a$, —$SO_2NR_bR_c$ and —$CO_2$—$R_a$, provided that $R_1$, $R_2$, $R_3$ and $R_4$ are not simultaneously the same, that at least one of $R_1$, $R_2$, $R_3$ and $R_4$ has an ionic hydrophilic group as a substituent, and that at least one or more of $R_1$, $R_2$, $R_3$ and $R_4$ is present on each of four benzene rings A, B, C and D of the copper phthalocyanine nucleus represented by the general formula (2), wherein $R_a$ represents a substituted or unsubstituted alkyl group; $R_b$ represents a hydrogen atom, or a substituted or unsubstituted alkyl group; and $R_c$ represents a substituted or unsubstituted alkyl group, wherein about 1 mol % to about 20 mol % of total counter ions in the copper phthalocyanine dye are ammonium ions or organic ammonium ions.

2. The ink for ink-jet recording according to claim 1, wherein an amount of the copper phthalocyanine dye is about 0.1 wt % to about 5.0 wt % based on a total weight of the ink for ink-jet recording.

3. The ink for ink-jet recording according to claim 1, wherein an amount of the thiazole-based compound is about 10 ppm to about 500 ppm, based on a total amount of the ink for ink-jet recording.

4. The ink for ink-jet recording according to claim 1, wherein the thiazole-based compound is benzisothiazolin, isothiazolin, 1,2-benzisothiazolin-3-one, 5-chloro-2-methyl-4-isothiazolin-3-one, 2-(thiocyanomethylthio)benzthiazole, 2-mercaptobenzthiazole or 3-allyloxy-1,2-benzisothiazole-1,1-oxide.

5. The ink for ink-jet recording according to claim 1, further comprising a benzotriazole-based compound.

6. The ink for ink-jet recording according to claim 5, wherein an amount of the benzotriazole-based compound is about 0.5 wt % or less, based on a total amount of the ink for ink-jet recording.

7. The ink for ink-jet recording according to claim 5, wherein the benzotriazole-based compound is 1H-benzotriazole, 4-methyl-1H-benzotriazole, 5-methyl-1H-benzotriazole, sodium or potassium salts thereof.

8. The ink for ink-jet recording according to claim 1, wherein, in the general formula (1), $R_1$, $R_2$, $R_3$ and $R_4$ are substituents represented by —$SO_2$—$R_a$, wherein $R_a$ is a substituted or unsubstituted alkyl group, provided that not all the four substituted or unsubstituted alkyl groups $R_a$ in $R_1$, $R_2$, $R_3$ and $R_4$ are completely identical.

9. The ink for ink-jet recording according to claim 1, wherein, in the general formula (1), k is a number satisfying 0<k<4; l is a number satisfying 0<l<4; m is a number satisfying 0≦m<4; n is a number satisfying 0≦n<4; and the sum of k, l, m and n is 4.

10. The ink for ink-jet recording according to claim 1, wherein, in the general formula (1), $R_1$ is a lithium sulfonato propylsulfonyl group; $R_2$ is an N-(2-hydroxypropyl) sulfamoylpropylsulfonyl group; k is 3; l is 1; and both m and n are 0.

11. The ink for ink-jet recording according to claim 1, wherein, in the general formula (1), $R_1$ is a lithium sulfonato propylsulfonyl group; $R_2$ is an N-(2-hydroxyisopropyl) sulfamoylpropylsulfonyl group; k is 3; l is 1; and both m and n are 0.

12. The ink for ink-jet recording according to claim 1, wherein, in the general formula (1), $R_1$ is a lithium sulfonato propylsulfonyl group; $R_2$ is an N,N-(di(2-hydroxyethyl))

sulfamoylpropylsulfonyl group; k is 3; l is 1; and both m and n are 0.

13. The ink for ink-jet recording according to claim 1, wherein, in general formula (1), $R_1$ is a lithium sulfonato propylsulfonyl group; $R_2$ is an N-(2-hydroxypropyl) sulfamoylpropylsulfonyl group; $R_3$ is an N-(2-hydroxyisopropyl) sulfamoylpropylsulfonyl group; k is 2; l is 1; m is 1; and n is 0.

14. The ink for ink-jet recording according to claim 1, wherein, in general formula (1), $R_1$ is a lithium sulfonato propylsulfonyl group; $R_2$ is a lithium carboxylato propylsulfonyl group; $R_3$ is an N-(2-hydroxypropyl) sulfamoylpropylsulfonyl group; $R_4$ is an N-(2-hydroxyisopropyl) sulfamoylpropylsulfonyl group; and k, l, m and n are 1.

* * * * *